US005470182A

United States Patent [19]

Krupotich et al.

[11] Patent Number: 5,470,182

[45] Date of Patent: Nov. 28, 1995

[54] ENVELOPE OPENING MACHINE

[75] Inventors: Edward A. Krupotich, Los Altos; Burton J. Rosensweig, Foster City, both of Calif.

[73] Assignee: Omation Corporation, Mountain View, Calif.

[21] Appl. No.: 192,002

[22] Filed: Feb. 4, 1994

[51] Int. Cl.[6] .......... B23C 3/00

[52] U.S. Cl. .......... 409/137; 30/DIG. 3; 409/138; 409/161

[58] Field of Search .......... 409/138, 204, 409/137, 155, 161; 408/224; 30/DIG. 3

[56] References Cited

U.S. PATENT DOCUMENTS

| | | | |
|---|---|---|---|
| 1,047,493 | 12/1912 | Bryant | 409/204 X |
| 2,656,889 | 10/1953 | Kaplan | 30/DIG. 3 |
| 3,160,069 | 12/1964 | Rogers | 409/138 |
| 3,998,254 | 12/1976 | Morin | 408/224 X |
| 4,182,529 | 1/1980 | Boudreault et al. | 409/138 |
| 4,364,696 | 12/1982 | Syarto et al. | 409/138 |
| 4,741,105 | 5/1988 | Wong | 30/DIG. 3 |

OTHER PUBLICATIONS

Copy of Brochure entitled "*The Envelopener*" by Omation Corporation, 4 pages.

*Primary Examiner*—Z. R. Bilinsky
*Attorney, Agent, or Firm*—Flehr, Hohbach, Test, Albritton & Herbert

[57] ABSTRACT

Envelope opening machine which is relatively small in size and suitable for use on table tops. The machine has a milling cutter and a pair of belts for feeding envelopes from a hopper past the cutter. The belts extend obliquely with respect to the path of the envelopes and tend to hold the envelopes tightly against a guide on one side of the path for precise alignment with the cutter. A removable chaff tray is located at the front of the machine, with a window for viewing the amount of chaff that has been collected. A removable cover overlies the belts and cutter, with hold-down wheels for maintaining the envelopes in contact with the belts and an interlock switch for deactuating the cutter when the cover is removed.

19 Claims, 6 Drawing Sheets

ENVELOPE OPENING MACHINE

This invention pertains generally to mail processing equipment and, more particularly, to a machine for opening envelopes to permit the removal of contents therefrom.

Envelope opening machines are coming in to increasingly wider use in order to reduce the amount of time required to process mail received by remittance processing centers, offices and other businesses. Most such machines slice off a strip along one or more edges of an envelope, which has a number of disadvantages. It produces a relatively large amount of cuttings or chaff which must be disposed of, the cuttings or chaff are in the form of relatively long strips which do not compact well, the envelopes get sharp edges which can cut the fingers of persons handling them, and a portion of the contents are often cut as well unless steps such as tapping or jogging are employed to move the contents away from the edges to be cut.

Other relatively expensive machines intended primarily for use in high production applications have utilized milling cutters with radial teeth for milling away the edge portions of envelopes. Such cutters have the advantages of cutting away only a small portion each envelope, producing a relatively small amount of cuttings or chaff in the form of small chips which are easier to handle than the strips produced by other openers. In addition, milling cutters produce cut edges on envelopes which are soft and feathered and not likely to cut persons handling the envelopes. Such machines do, however, have a disadvantage in that they are large and expensive, and not suitable for use in smaller offices and businesses.

It is in general an object of the invention to provide a new and improved machine for opening envelopes.

Another object is to provide a machine of the above character which overcomes the limitations and disadvantages of envelope opening machines heretofore provided.

Another object is to provide a machine of the above character which is relatively small in size and suitable for use by smaller businesses.

These and other objects are achieved in accordance with the invention by providing a envelope opening machine which is relatively small in size and suitable for use on table tops. The machine has a milling cutter and a pair of belts for feeding envelopes from a hopper past the cutter. The belts extend obliquely with respect to the path of the envelopes and tend to hold the envelopes tightly against a guide on one side of the path for precise alignment with the cutter. A removable chaff tray is located at the front of the machine, with a window for viewing the amount of chaff that has been collected. A removable cover overlies the belts and cutter, with hold-down wheels for maintaining the envelopes in contact with the belts and an interlock switch for deactuating the cutter when the cover is removed.

Figure 1:
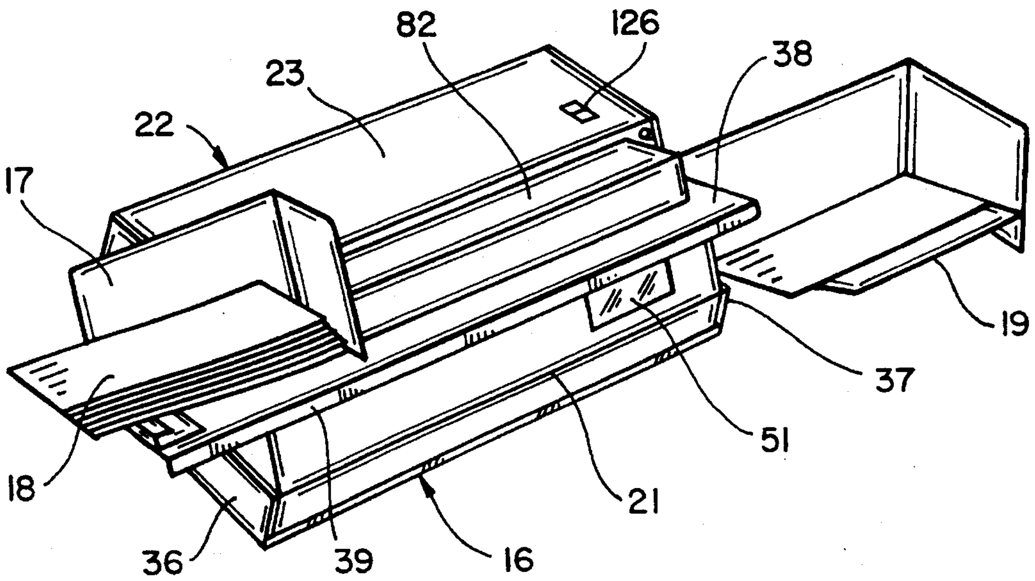
FIG. 1 is an isometric view of one embodiment of an envelope opening machine according to the invention.
Figure 13:
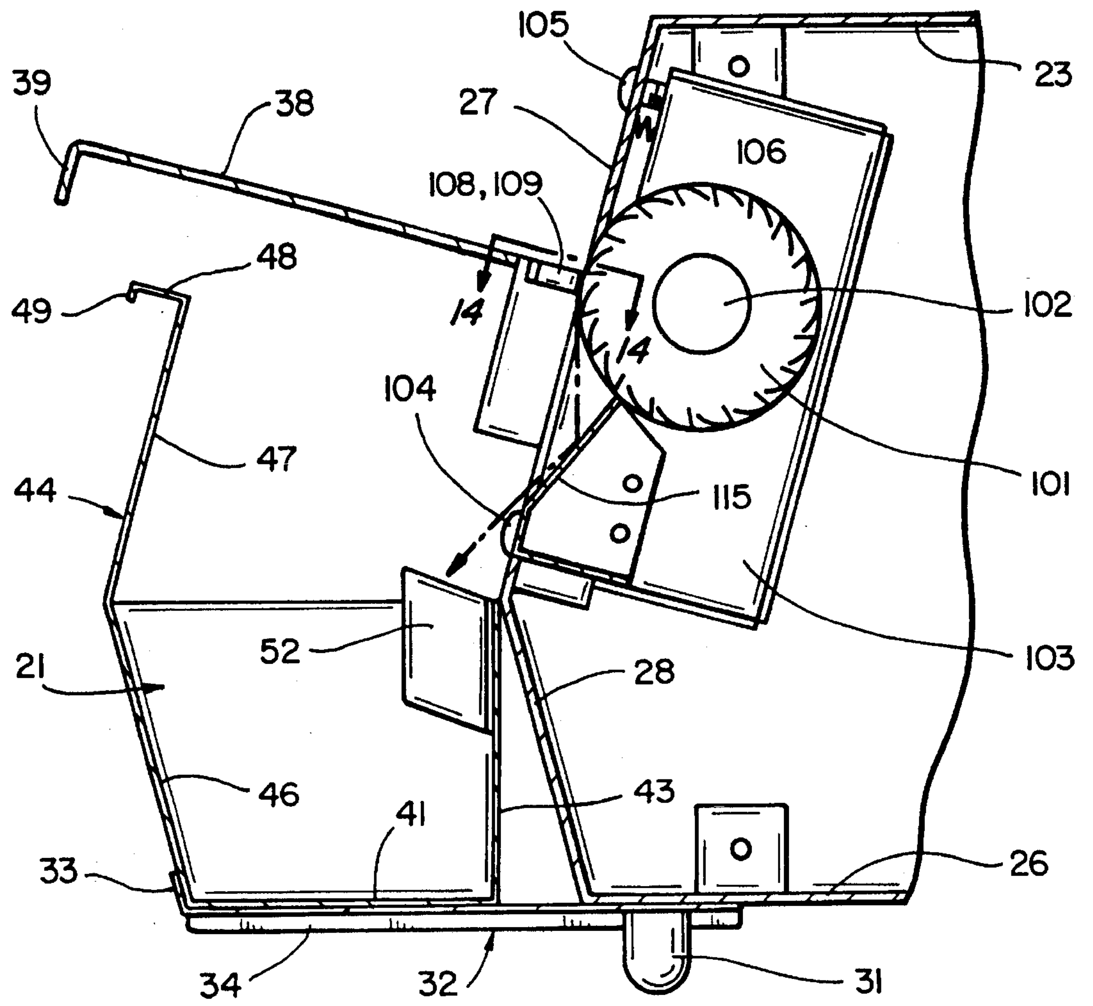

FIG. 13 an enlarged fragmentary sectional view illustrating the cutter assembly in the machine of FIG. 1.

Figure 14:
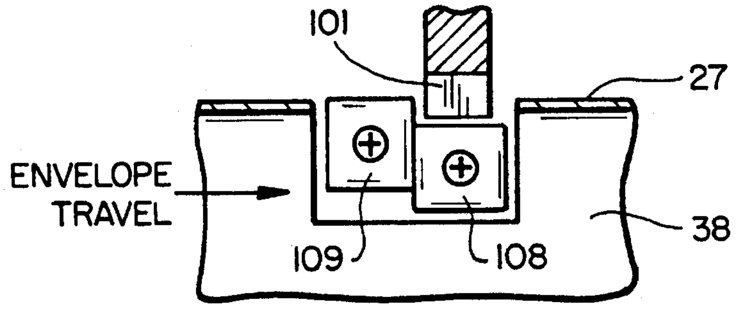

FIG. 14 is a cross-sectional view taken along line 14—14 in FIG. 13.

As illustrated in FIG. 1, the machine includes a base 16 which is adapted to rest on a table top or other horizontal surface. A hopper 17 is positioned toward one end of the machine for holding a stack of envelopes 18 to be opened and an output tray 19 is placed next to the other end of the machine for receiving envelopes which have been opened. As discussed more fully hereinafter, envelopes from the hopper are conveyed past a milling cutter 20 (not visible in FIG. 1) which cuts away a small portion of each envelope along one edge thereof. Cuttings or chaff from the cutter is collected in a removable tray 21 on the front side of the machine.

The base includes a housing 22 which has a top panel 23, a front panel 24 and a bottom panel 26 formed as a unitary structure from sheet metal. The top and bottom panels extend horizontally, and the front panel has an upper section 27 which slopes upwardly and rearwardly at an angle on the order of 15° to the vertical and a lower section 28 which slopes downwardly and rearwardly at a similar angle. The housing also includes a rear cover 29 which has a contour similar to front panel 24. Mounting feet 31 are attached to the under side of bottom panel 26 near the four corners of the panel.

A base plate 32 extends horizontally from bottom panel 26 along the front side of the housing and has an upstanding flange or lip 33 along the front edge thereof. This flange slopes upwardly from the plate and toward the front of the machine in a direction parallel to the lower section 28 of the front panel. Downwardly extending flanges 34 at the ends of the plate provide lateral rigidity for it.

End plates 36, 37 close off the ends of the housing and project from the housing in a forward direction to the front edge of base plate 32. The front edges of the end plates have a contour similar to that of front panel 24, with upper and lower sections parallel to the two sections of that panel.

A transport plate, or shelf, 38 projects in a forward direction from the upper section 28 of front wall 24, and envelopes to be opened are transported over the upper surface of this plate. The transport plate extends horizontally from one end of the machine to the other and slopes downwardly and rearwardly in a direction perpendicular to the upper section of the front panel, i.e. at an angle on the order of 15° degrees to the horizontal. A downwardly extending flange 39 along the front edge of the transport plate adds rigidity to the plate.

End plates 36, 37 together with base plate 32 and the lower section 28 of front panel 24, form a pocket for the removable chaff tray 21 beneath transport plate 38. The chaff tray has a horizontally extending bottom wall 41, vertically extending end walls 42, a rear wall 43 which extends vertically from the rear edge of the bottom wall, and a front wall 44. The front wall has a lower section 46 which slopes upwardly and outwardly in a direction parallel to the lower section 27 of front panel 24, and an upper section 47 which slopes upwardly and rearwardly in a direction parallel to the upper section 28 of the front panel, i.e. at an angle on the order of 15° to the vertical. A flange 48 projects in a forward direction from the upper edge of front wall 44 at a right angle to the upper section of the wall, and a lip 49 extends in a downward direction from the front edge of the flange. Felt pads 50 are affixed to the outer surfaces of the end wall of the tray to provide cushioning between those walls and end plates 36, 37.

Flange 48 and lip 49 provide a handle by which the tray can be lifted into and removed from the machine. The tray is fabricated of sheet metal, and its center of gravity is located to the rear of the corner formed between the bottom and front walls of the tray. That corner acts as a fulcrum as the tray is tilted into and out of the pocket, and the tray's own weight holds the tray in stable position in the pocket without need for any additional means to hold the tray in place.

A transparent window 51 is provided in the upper section of the front wall of the chaff tray to permit visual observation of cuttings or chaff collected in the tray, and a deflector plate 52 is mounted on the rear wall of the tray below the cutter to spread the chaff throughout the tray and prevent it from building up beneath the cutter. In the embodiment illustrated, the cutter is located toward the right end of the machine, and the deflector plate slopes downwardly toward the left. A short post 53 extends rearwardly from the rear wall of the tray and engages the operating lever of a safety interlock switch 54 mounted on the front panel of the housing to deactuate the drive mechanism and cutter when the tray is removed.

If desired, a sensor can be added to the tray to shut down the machine when the chaff reaches a predetermined level, but such a sensor is not believed to be necessary in most applications since it is so easy to visually monitor the level of the chaff through the window in the tray.

The drive mechanism or transport assembly includes a feed belt 56 and a transport belt 57. The feed belt extends beneath the hopper and draws the lowermost envelope off the stack in the hopper and feeds it along the initial portion of the transport path. The transport belt overlaps with the feed belt and runs to the other end of the machine for carrying envelopes from the feed belt to the cutter and out of the machine.

The two belts are part of a transport assembly 58 which is mounted on the under side of transport plate 38. Feed belt 56 is trained about a drive pulley 59 and a pair of idler pulleys 61, 62 on the front side of the assembly, with an additional idler 63 engaging the lower run of the belt from the outside for tensioning the belt. Transport belt 57 is trained about a drive pulley 64 and idler pulleys 66–70 on the rear side of the assembly, with an additional idler 71 engaging the lower run of the belt from the outside for tensioning the belt. Drive pulleys 59, 64 are mounted on a drive shaft 72 which extends through the front panel of the housing and is driven by a motor 73 within the housing through pulleys 74, 76 and a drive belt 77.

The upper runs of feed belt 56 and transport belt 57 project through slotted openings 78, 79 in the transport plate and extend a short distance the above upper surface of the plate. While the runs of the belts are generally in the longitudinal direction relative to the transport surface, the belts are inclined at an angle on the order of 2 to 3 degrees relative to the front panel of the housing, converging toward the panel at the output end of the machine. A surface on the front panel above the transport plate serves as a guide for the envelopes, and, if desired, a strip of wear resistant metal can be attached to the front surface in this area to serve as a reference surface. The skewing of the belts holds the rear edges of the envelopes against the guide surface as the envelopes travel through the machine. A plurality of hold-down rollers 81 are mounted on a cover 82 above the transport surface for holding in contact with the transport belt. The rollers are carried by arms 83 which are pivotally mounted to brackets 84 on the under side of the top wall 86 of the cover, with springs 87 urging the rollers in a downward direction. The rollers are aligned with the belt and positioned directly above it when the cover is in its closed position.

A pair of separator stones 89 are also mounted in cover 82 for preventing the withdrawal of more than one envelope at a time from the hopper. The stones are mounted in a relatively stationary position on an arm 91 which is pivotally mounted on a bracket 92 on the underside of the top wall of the cover at a point near the hopper, and straddle the feed belt when the cover is in its closed position. The stones are urged in a downward direction by a spring 93.

Figure 2:
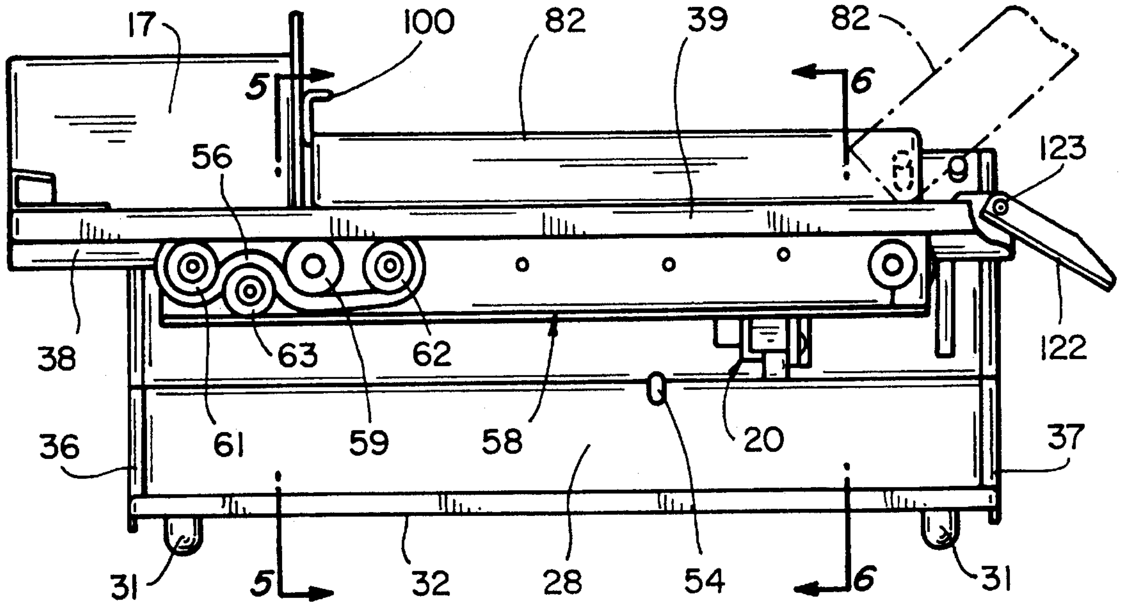
FIG. 2 is a front elevational view of the machine, with the chaff tray removed.
Figure 3:
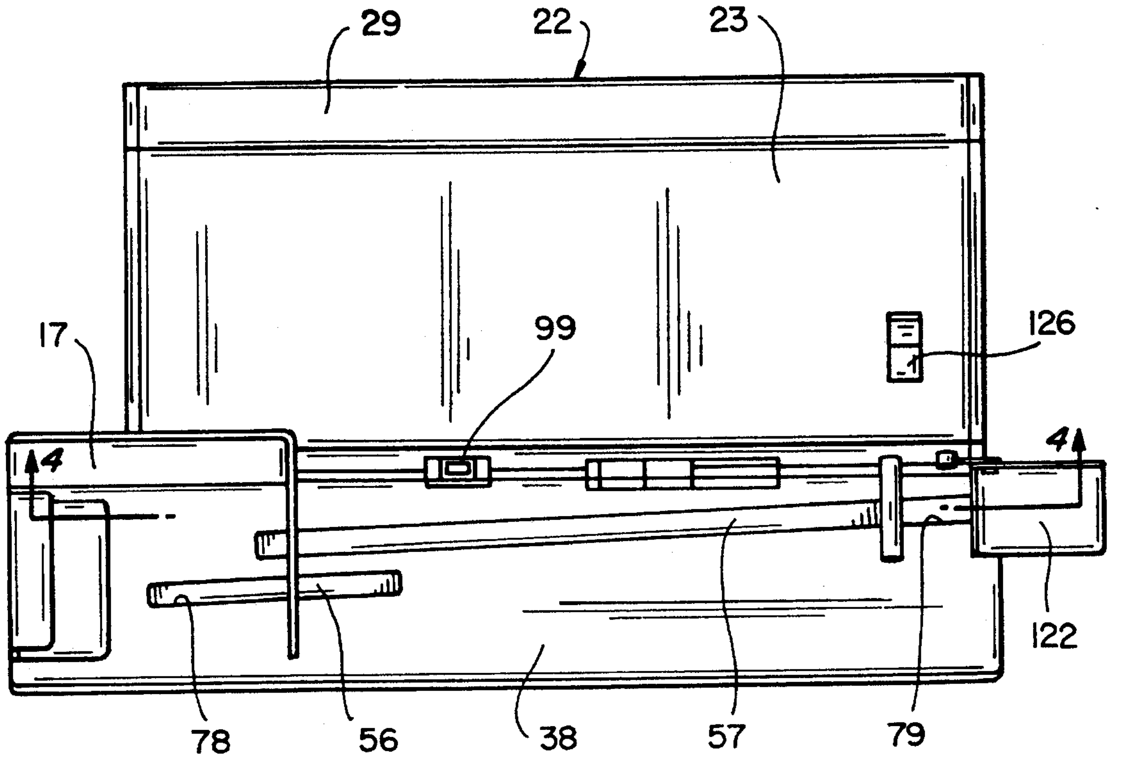
FIG. 3 is top plan view of the machine, with the hold-down assembly removed.
Figure 4:
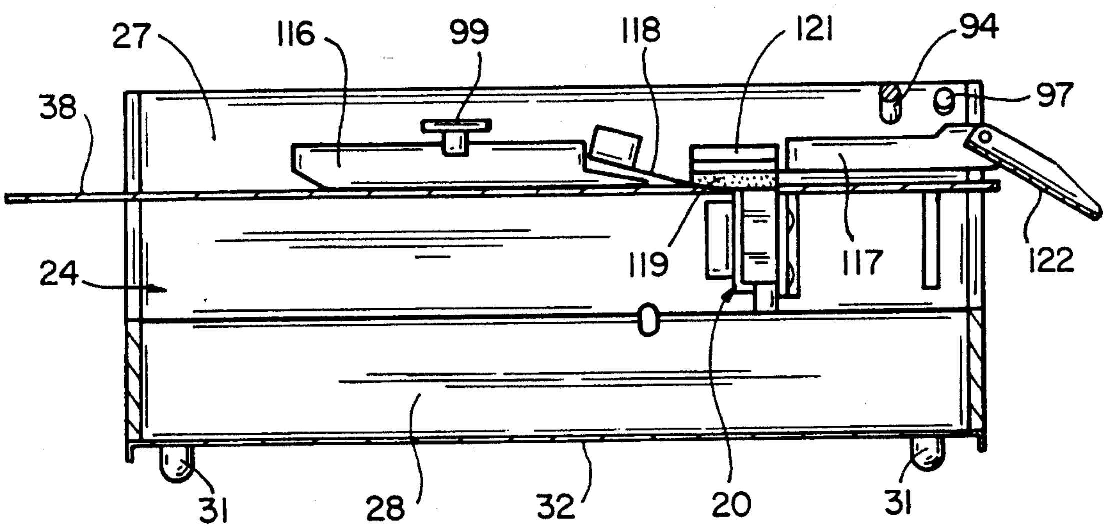
FIG. 4 is a sectional view taken along line 4—4 in FIG. 3.
Figure 5:
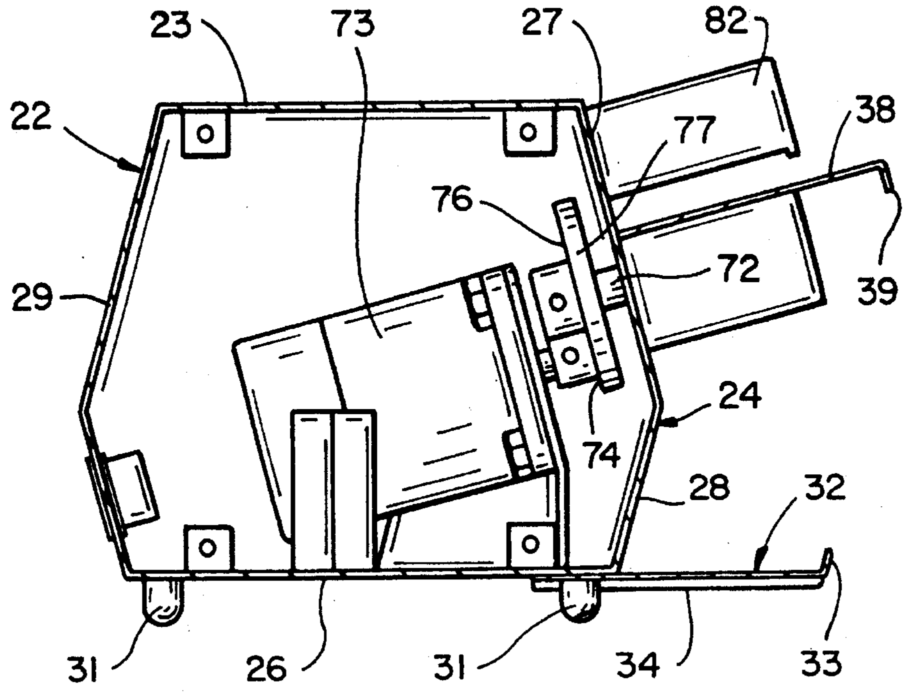
FIG. 5 is a cross-sectional view taken along line 5—5 in FIG. 2.
Figure 6:
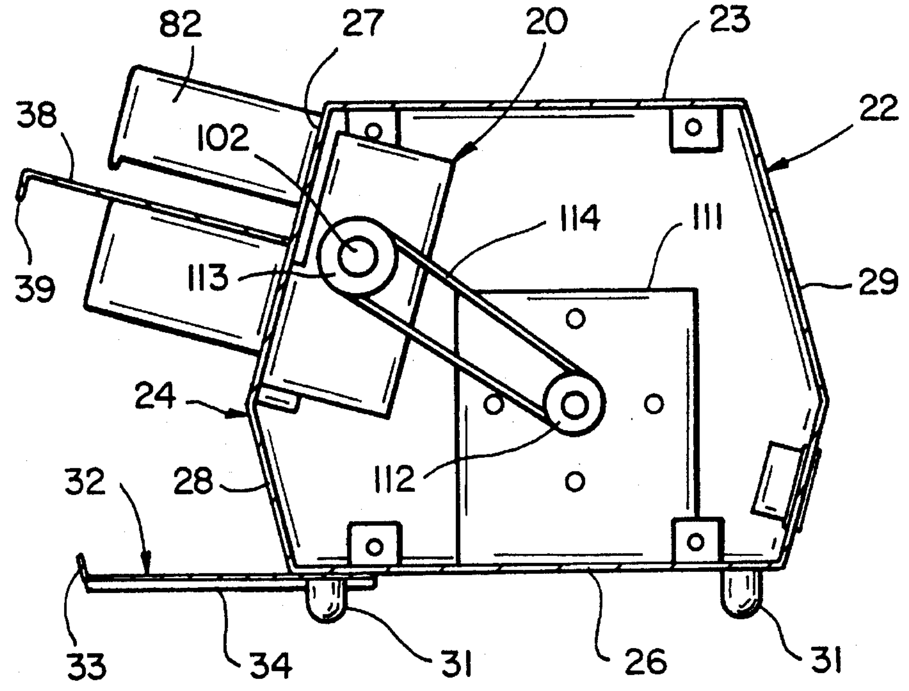
FIG. 6 is a cross-sectional view taken along line 6—6 in FIG. 2.
Figure 7:
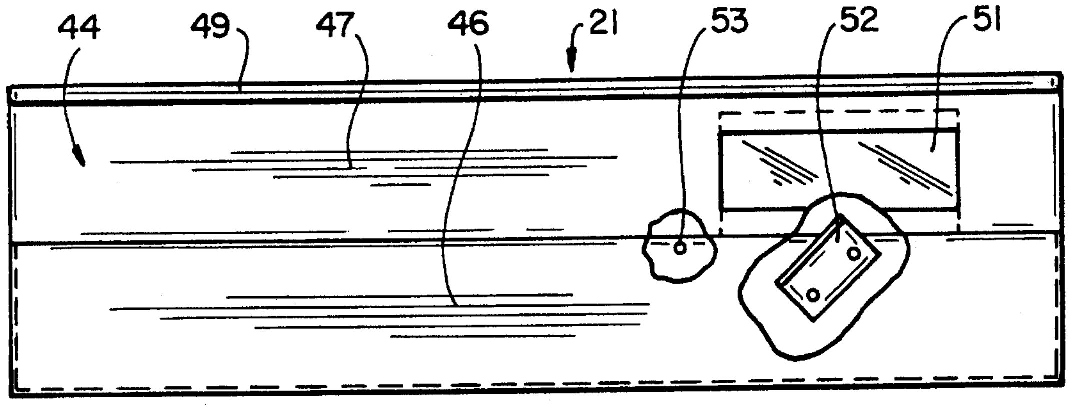
FIG. 7 is a front elevational view, partly broken away, of the chaff tray in the machine of FIG. 1.
Figure 8:
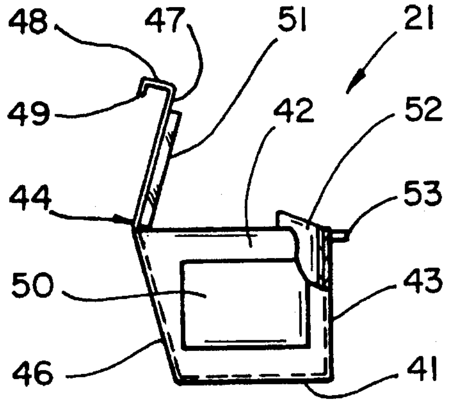
FIG. 8 is an end view, partly broken away, of the chaff tray.
Figure 9:
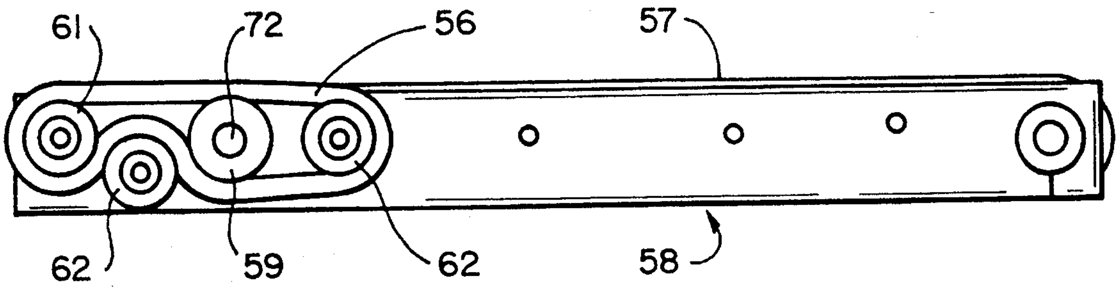
FIG. 9 is a front elevational view of the transport assembly in the machine of FIG. 1.
Figure 10:
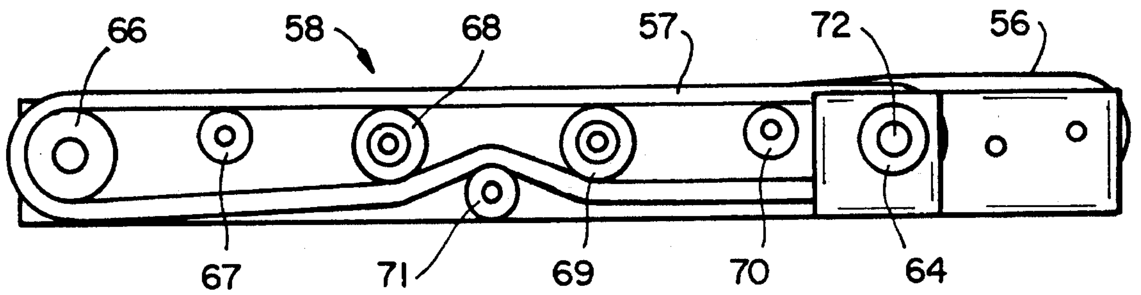
FIG. 10 is a rear elevational view of the transport assembly in the machine of FIG. 1.
Figure 11:
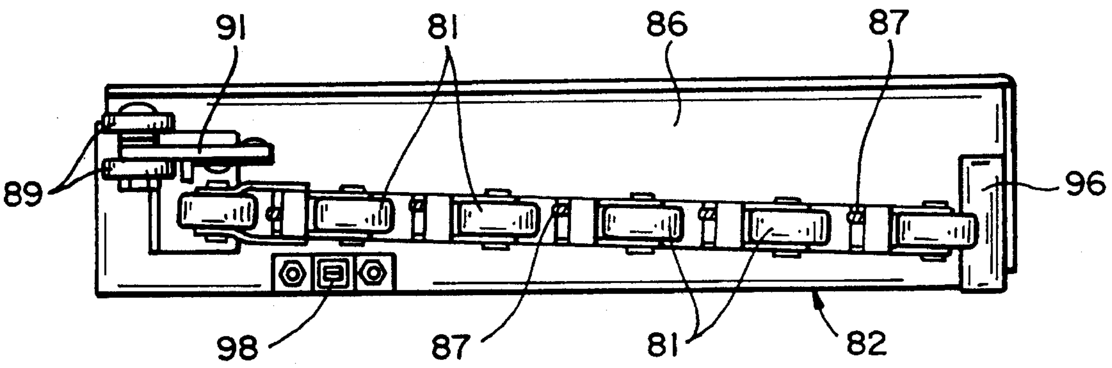
FIG. 11 is a bottom plan view of the hold-down assembly in the machine of FIG. 1.
Figure 12:
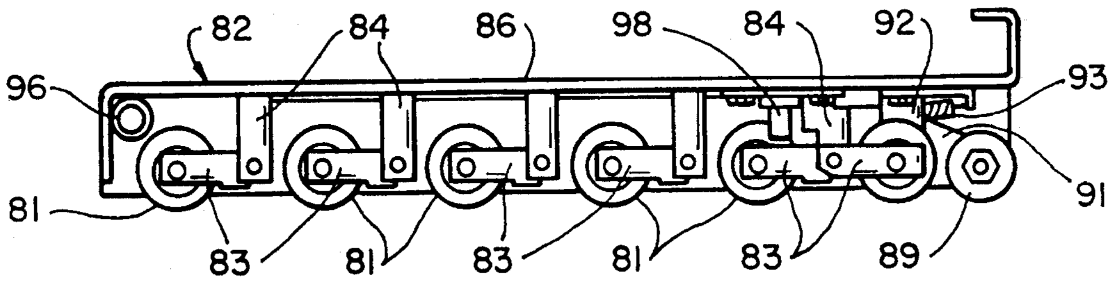
FIG. 12 is a rear elevational view of the hold-down assembly of FIG. 11.

Cover 82 is removably mounted on the base housing by a hinge mount consisting of a pin 94 which projects in a forward direction from the front panel and a ferrule 96 on the cover. The hinge is located toward the right end of the machine, and the cover swings in a clockwise direction, as viewed from the front, between its closed position and an open position which is shown in dashed lines in FIG. 2. A stop pin 97 projects from the front panel of the housing and serves as a limiting abutment for the cover in the open position. A latch strike 98 on the cover engages a latch mechanism 99 on the housing to hold the cover in its closed position. In addition to being swung to the open position, the cover assembly can be readily removed from the machine by pulling it in a forward direction to disengage the ferrule from the hinge pin. An L-shaped flange 100 extends in an upward direction at the left end of the cover to provide a handle by which the cover can be lifted.

If desired, the cover can also be provided with a safety interlock switch similar to switch 53, 54 to deactuate the drive mechanism and the cutter when the cover is open or removed.

The cutter assembly 20 includes a milling cutter 101 in the form of a wheel with a plurality of radial teeth. In one presently preferred embodiment, the wheel has a diameter on the order of 2½ inches, and the teeth have a width on the order of ¼ inch. The cutter is wheel is mounted on shaft 102 which is rotatively mounted on a block 103, with the axis of the cutter wheel parallel to the corner formed at the intersection of the upper surface of transport plate 38 and the reference surface on front panel 24. The block is mounted on the back side of the front panel, with the axis of the cutter wheel spaced from the corner by a distance slightly less than the radius of the wheel so that the teeth project through an opening in the corner and into the path of the envelopes by an adjustable distance on the order of 0.005 to 0.090 inch. The cutter assembly is attached to the front panel by screws 104, 105 which pass through the panel and are threaded into the block. Screw 104 is located toward the lower end of the block and is tightened to hold the that end of the block tight against the back side of the panel. A short compression spring 106 is positioned between the panel and the block just below screw 105, and that screw is tightened against the force of the spring to adjust the position of the upper portion of the block and, hence, the depth of the cut. The amount of adjustment is small, and the panel has sufficient flexibility to permit the adjustment to be made with the lower portion of the block securely affixed to the panel.

The cutter assembly also includes a pair of anvils 108, 109 which cooperate with the teeth on the wheel in cutting off the edge portion of an envelope. Anvil 108 is positioned directly in front of the wheel and spaced from the peripheral face of the wheel by a distance on the order of 0.001 inch, or less. Anvil 109 is positioned to the left side of the wheel and extends along the side of the teeth to prevent the formation of strips as material is removed from the envelopes. The anvils are thus arranged in an L-shaped configuration, with anvil 108 positioned on the side of the wheel from which the envelopes come in their travel. The anvils and cutter wheel are preferably made of a hardened material such as tungsten carbide steel.

The cutter is driven by a motor 111 mounted within the housing and connected to drive shaft 102 by pulleys 112, 113 and a drive belt 114. A deflector 115 is included in the cutter assembly below the cutter wheel for directing cuttings or chaff from the cutter in a downward and forward direction into the chaff tray.

Guide plates 116, 117 are mounted on front panel 24 and extend substantially the entire length of the transport surface. These plates project out from the panel by about ⅛ inch and have lower edges which are spaced about ¼ above the surface to prevent the edges of envelopes from lifting away from the surface as they travel across it.

A resilient finger 118 having a width on the order of ½ inch is also mounted on the panel for holding the envelopes tightly against the transport surface as they pass through the cutter. The finger extends in a downward direction toward the right, or output, side of the machine and is urged in a downward direction by its own resiliency and by block of resilient foam 119 on the under side of a bracket 121 affixed to the panel in front of the cutter. The portion of the finger adjacent to the cutter is notched to provide clearance for it.

A deflector 122 is attached to the housing at the output end of the machine for deflecting envelopes leaving the machine down into output tray 19. In the embodiment illustrated the deflector is attached to guide plate 117 by a screw 123 which permits the angle of the deflector to be adjusted.

Energization of drive motors 73, 111 is controlled by an ON/OFF switch 126 mounted on the top panel of the housing. Safety interlock switch 54 is wired in series with the ON/OFF switch for deenergizing the motors to deactuate the drive mechanism and cutters when the chaff tray is removed.

Operation and use of the machine is as follows. A stack of envelopes to be opened is placed in hopper 17, and the drive motors are turned on. Feed belt 56 feeds the lowermost envelope in the stack along the transport path, and transport belt 57 carries it past the cutter where the edge portion of the envelope is trimmed away. Deflector 115 directs chaff produced by the cutting action into chaff tray 21 where it hits the inclined surface of deflector plate 52 and is distributed throughout the tray. The amount of chaff in the tray is monitored through the window in the tray, and when the tray is full, it is removed and emptied. After being cut opened, the envelope travels to the end of the transport surface and drops in to output tray 19. As each envelope clears the separator stones the next envelope withdrawn from the bottom of the stack, and fed past the cutter.

The invention has a number of important features and advantages. It provides a compact, highly efficient machine which can be placed on a table top or other convenient surface and can operate automatically to open a large number of envelopes. The envelopes are held tightly against the guide surface by the skewed belts, and the precision of the machine makes it possible to cut away such a small portion of the envelopes, e.g. 0.010 to 0.015 inch, that there is no danger of cutting off part of the contents as well. The chaff produced by the milling action consists of relatively small particles which are easy to dispose of, and the location of the chaff tray at the front of the machine and the window in the sloping wall of the tray make it easy to monitor the level of the chaff and empty the tray. Furthermore, the milling cutter, not heretofore available in a small compact envelope opening machine, produces a feathered edge on the cut edges of the envelopes, which prevents finger cuts.

It is apparent from the foregoing that a new and improved envelope opening machine have been provided. While only one presently preferred embodiment has been described in detail, as will be apparent to those familiar with the art, certain changes and modifications can be made without departing from the scope of the invention as defined by the following claims.

We claim:

1. In machine for opening envelopes, a transport surface, a guide extending longitudinally of the transport surface and intersecting the surface to form a corner, a transport belt extending obliquely of the guide and projecting through an opening in the transport surface for conveying an envelope along the surface with one edge of the envelope in contact with the guide, and a rotatively driven milling cutter having radially facing teeth projecting through the corner for cutting away the edge portion of an envelope as it is conveyed past the cutter.

2. The machine of claim 1 wherein the milling cutter is rotatable about an axis parallel to the corner, and the teeth of the cutter project through an opening in the corner by a distance on the order of 0.005–0.090 inch.

3. The machine of claim 1 including hold-down rollers positioned above the belt for holding the envelope in contact with the belt.

4. The machine of claim 1 including a hopper positioned toward one end of the transport surface for holding a stack of envelopes to be opened, and means including a feed belt for feeding one envelope at a time from the hopper to the transport belt.

5. The machine of claim 1 including a removable tray positioned beneath the transport surface for collecting chaff produced as the edge portion of the envelope is cut away by the milling cutter.

6. In a machine for opening envelopes: a base adapted to rest upon a horizontal supporting surface such as a table top, means mounted on the base for conveying an envelope along a predetermined path from one end of the machine to the other, a milling cutter rotatively mounted on the base with radially facing teeth for cutting away an edge portion of the envelope conveyed along the path, and a tray removably mounted to the base along the front side of the machine for collecting chaff produced by the cutter.

7. The machine of claim 6 wherein the tray has an upwardly facing front wall inclined at an angle on the order of 15° to the vertical, and a transparent window in the wall through which chaff in the tray can be viewed.

8. The machine of claim 6 including a deflector positioned beneath the cutter for spreading chaff from the cutter throughout the tray.

9. The machine of claim 6 including a first deflector positioned beneath the cutter for directing chaff from the cutter into the tray, and a second deflector positioned within the tray for spreading chaff from the first deflector throughout the tray.

10. The machine of claim 6 including a pair of anvils arranged in an L-shaped configuration adjacent to the teeth of the cutter for cooperative action with the cutter in cutting away the edge portion of the envelope, one of the anvils being positioned in front of the teeth and the other the anvil extending along one side of the teeth.

11. The machine of claim 6 including means responsive to the level of chaff in the tray for deactuating the cutter when the chaff reaches a predetermined level.

12. The machine of claim 6 including means responsive to removal of the tray for deactuating the cutter when the tray is removed.

13. In a machine for opening envelopes: a transport surface, a belt projecting through an opening in the surface for conveying an envelope along the surface, a cutter for removing an edge portion of the envelope as the envelope is conveyed along the surface, a removable cover overlying the transport surface and the cutter, and hold-down wheels carried by the cover for holding the envelope in contact with the belt.

14. The machine of claim 13 including an interlock switch actuated by the cover for deactuating the cutter when the cover is removed.

15. The machine of claim 13 wherein the cover is hingedly mounted toward one end thereof for movement away from the transport surface and belt.

16. In a machine for opening envelopes: a base adapted to rest on a horizontally extending table top, a transport surface extending from one end of the base to the other, a hopper positioned toward one end of the base for holding a stack of envelopes to be opened, a guide extending longitudinally of the transport surface and intersecting the surface to form a corner, a transport belt extending obliquely of the guide and projecting through an opening in the transport surface for conveying an envelope along the surface and urging one edge of the envelope into contact with the guide, a feed belt for feeding envelopes from the hopper to the transport belt, a milling cutter having radial teeth projecting through the corner for removing an edge portion of the envelope as the envelope is conveyed past the cutter, a tray mounted on the base beneath the cutter and removable from the front of the machine for collecting chaff produced by the cutter, a removable cover overlying the transport surface and cutter, a pair of separator stones carried by the cover straddling the feed belt for preventing more than one envelope at a time from being fed from the hopper, hold-down wheels mounted on the cover above the transport belt for holding an envelope in contact with that belt, and an interlock switch actuated by the cover for deactuating the cutter when the cover is removed.

17. The machine of claim 16 wherein the tray has an upwardly facing front wall inclined at an angle on the order of 15° to the vertical, and a transparent window in the wall through which chaff in the tray can be viewed.

18. The machine of claim 16 including a first deflector positioned beneath the cutter for directing chaff from the cutter into the tray, and a second deflector positioned within the tray for spreading chaff from the first deflector throughout the tray.

19. The machine of claim 16 including a deflector positioned beneath the cutter for spreading chaff from the cutter throughout the tray.

* * * * *